Dec. 20, 1949  H. G. HUGHEY  2,491,563
APPARATUS FOR CUTTING METAL
Filed Dec. 28, 1944
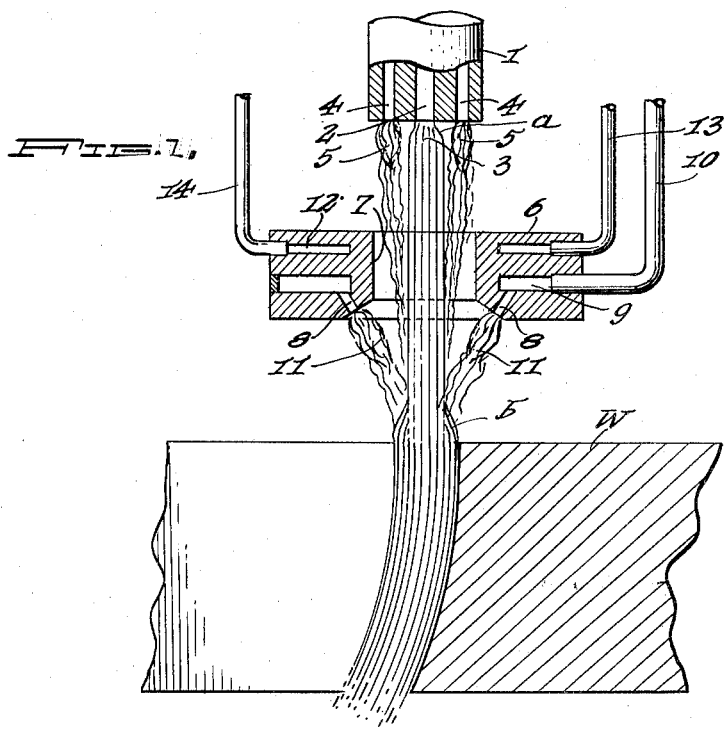
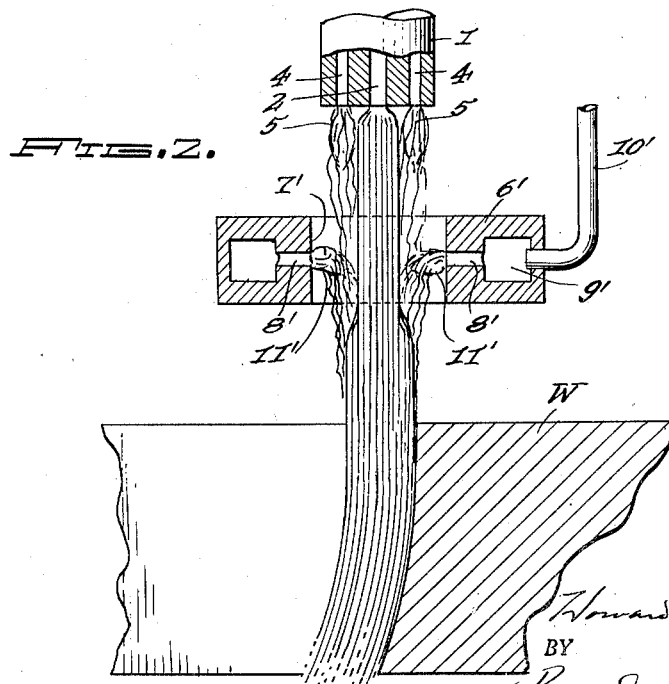
INVENTOR.
Howard G. Hughey
BY
ATTORNEYS.

Patented Dec. 20, 1949

2,491,563

UNITED STATES PATENT OFFICE 2,491,563

APPARATUS FOR CUTTING METAL

Howard G. Hughey, Fanwood, N. J., assignor to Air Reduction Company, Incorporated, a corporation of New York Application December 28, 1944, Serial No. 570,081

4 Claims. (Cl. 158—27.4)

This invention relates to improvements in the thermo-chemical cutting of metal.

I have found that when cutting metal by means of a gas cutting torch, such as an oxyacetylene cutting torch, and particularly when cutting metal of heavy section, the usual preheating flames play a more important part in the cutting operation than is generally recognized. They not only serve to preheat the metal to bring it to kindling temperature but they impart some heat to the cutting oxygen stream after it leaves the torch tip, and this seems to have a beneficial effect upon the cutting operation, particularly when making heavy cuts, due, it is believed, to the resulting expansion and consequent increase in velocity of the oxygen stream. Moreover, the preheating flames seem to control to a certain extent the chemical reaction. If the products of combustion from the preheating flames, and the unburnt gases, are too extensive, the cutting oxygen will, of course, be diluted to such an extent that the cutting operation is detrimentally affected. However, moderate dilution of the oxygen stream is believed to be helpful in preventing over-activity of the cutting oxygen stream in the zone near the entrance to the cut, since at this place the purest oxygen and maximum temperature exist. Dilution of the cutting oxygen which will damp or deter its activity in this zone to make it approximately equal to that in the lower portion of the cut will result in a smooth and uniform operation without the pocketing that sometimes occurs if the cut at the surface of the work progresses too fast in relation to its progression in the lower portion of the kerf. Therefore, with proper preheating conditions, it is believed that the products of combustion and unburnt gases at the surface of the metal and in the upper portion of the kerf dilute the oxygen stream, or otherwise lessen its cutting ability, to about the proper extent, when cutting work-pieces of average section, to retard the cutting action near the surface of the work just about enough to insure that the rate of progression of the cut near the surface of the work is substantially the same as that in the lower portion of the kerf. Furthermore, it is believed that once the cut has been started, the part played by the preheating flames in insuring continuance of the cutting operation, is due not so much to the maintenance of the proper degree of heat by the flames, but to this action of the products of combustion in tending to balance the chemical reaction at the upper and lower portions of the kerf.

Because of these considerations, I propose, in accordance with the present invention, to provide means for augmenting the usual preheating flame system with one or more auxiliary or additional flame systems to heat the cutting oxygen stream, after it leaves the torch tip, to a greater extent than do the usual preheating flames alone, and to bring about through the products of combustion of the additional flame system or systems even greater control of the chemical reaction than is obtainable by the use of the usual preheating flames alone.

The invention is illustrated in the accompanying drawing, in which:

Fig. 1 is a more or less diagrammatic representation of a metal work-piece being cut by a cutting torch (the torch tip only being shown) and one form of means that may be employed for providing an additional flame system, all of the parts being shown mostly in vertical section; and Fig. 2 is a view corresponding to Fig. 1 but illustrating a modified form of means that may be employed for providing the additional flame system.

Referring first to Fig. 1, the metal work-piece is represented at W. A portion of the tip of the cutting torch is shown at 1. It may be of a standard type having a central passage 2 from which the cutting oxygen stream 3 issues, and a series of surrounding passages 4 for the combustible gas mixture that feeds the usual preheating flames 5.

An auxiliary heating ring 6 is positioned between the discharge end of the tip and the work-piece, and has a central opening 7 through which the oxygen stream can pass. The heating ring has a number of jet passages 8 all communicating with a distributing channel 9 to which a combustible gas mixture, such as oxygen and acetylene, is delivered by a supply tube 10. When the gas mixture issuing from the passages 8 is ignited, a number of flame jets 11 are produced which constitute the auxiliary or additional flame system above referred to. Any desired number of jet passages 8 may be provided to produce an appropriate number of flame jets, preferably four or more being formed in the ring. They are preferably inclined, as shown in the drawing, so that their flame jets will be directed toward the cutting oxygen stream 3.

Obviously, the auxiliary heating ring is subjected to considerable heat during a cutting operation, so all or a portion of it may be made of suitable refractory material, or the ring may be cooled in any suitable way, as by a passage 12 in the ring through which a cooling fluid, such as water, may be circulated by the supply tube 13 and discharge tube 14.

Fig. 2 shows a modified form of auxiliary heating ring 6', the central opening 7' of which is larger in diameter than the corresponding opening in the heating ring shown in Fig. 1. This type of ring will be subjected to less heat than the type with the larger opening, and therefore, the use of cooling means such as that described in connection with Fig. 1 may be omitted if desired, especially when the ring is made of refractory material. When the central opening of the ring is relatively large as in Fig. 2, it may be desirable to give the jet passages 8' less inclination than shown in Fig. 1, or no inclination at all, so that the flame jets 11' will be directed more nearly normal to the axis of the cutting oxygen jet, as shown in Fig. 2.

When using the auxiliary heating ring the torch tip is held farther from the work than is customary. Some heat will be imparted to the cutting oxygen stream by the usual preheating flames 5, but due to the provision of the supplemental flame system, the contact time between the oxygen stream and the flames is increased, thus imparting to the oxygen stream considerably more heat than can be imparted to it by the usual preheating flames alone. I do not wish to be confined to any particular theory as to why this should have a beneficial effect on the cutting operation, but the following is offered as the most likely explanation:

The usual preheating flames heat the oxygen stream to some extent and cause expansion of it, as represented at $a$. The expansion causes force components to develop which tend to increase the velocity of the oxygen stream after it passes beyond the tip. The additional flame system causes considerably more heat to be imparted to the oxygen stream by the time it reaches the work-piece, causing further expansion of it, as represented at $b$. This results in a further increase in the velocity of the oxygen stream, which, of course, is desirable, especially when doing heavy cutting. The products of combustion from the additional heating flames augment those from the usual preheating flames and therefore lessen the cutting ability of the oxygen stream at the upper portion of the kerf, by dilution or otherwise, considerably more than it would be lessened solely by the products of combustion from the usual preheating flames, and when cutting work-pieces of heavy section, this results in preserving the proper balance between the chemical reactions at the upper and lower portions of the kerf.

Increasing the distance between the torch tip and the work-piece, as above described, does not interfere with the cutting operation, even though the usual preheating flames do not then reach the surface of the work because the additional flame system insures that the metal at the top of the cut is maintained at kindling temperature, or as above explained, the maintenance of the cutting operation, when doing heavy cutting, may be insured merely by the increased amount of products of combustion at the top of the cut caused by the presence of the additional flame system.

The expansion of the oxygen stream by the heat imparted to it by the auxiliary flame system may cause a slight increase in the width of the kerf cut in the work-piece, but this is of no consequence when cutting heavy sections and rough stock such as billets and the like, and the advantage of being able to cut through heavier sections with the aid of the auxiliary flame system, than without it, offsets any disadvantage resulting from the expanded oxygen stream. If an attempt were made to adapt a standard cutting torch for heavier cutting merely by making the usual preheating flames larger for the purpose of obtaining the additional heat for the oxygen stream and the additional products of combustion, contemplated by my invention, then the flame jets would curve the top edges of the kerf. This does not occur with the auxiliary flame jets herein described since they are directed toward the cutting oxygen stream. Moreover, the use of large preheating flames directed down into the kerf would tend to produce too great a quantity of products of combustion in the lower portion of the kerf, which could easily upset the proper balance between the chemical reactions at the upper and lower portions of the kerf.

If desired, more than one auxiliary heating ring may be employed to provide several of the auxiliary or additional flame systems through which the cutting oxygen stream passes successively.

The invention should not be confused with preheating the oxygen stream within the torch as already proposed and which is commonly referred to as superheating, as that does not produce the same results that I obtain by my method and apparatus.

I claim:

1. The combination with a gas cutting torch having tip means adapted to provide preheating flames and a cutting oxygen jet of auxiliary means positioned between the torch tip and the work-piece adapted to direct at least one heating flame toward and against the jet of cutting oxygen after it leaves the torch tip and before it reaches the work-piece.

2. The combination with a gas cutting torch having a tip adapted to provide preheating flames and a cutting oxygen jet of an auxiliary heating ring positioned between the torch tip and the work-piece and through the central opening of which the jet of cutting oxygen is directed on its way to the work-piece, and means operatively associated with said ring for producing heating flames directed inwardly toward and against the jet of cutting oxygen as it passes through the ring.

3. The combination with a gas cutting torch having a tip adapted to provide preheating flames and a cutting oxygen jet of an auxiliary heating ring positioned between the torch tip and the work-piece and through the central opening of which the jet of cutting oxygen is directed on its way to the work-piece, means operatively associated with said ring for producing heating flames directed inwardly toward and against the jet of cutting oxygen as it passes through the ring, and means for cooling said ring.

4. The combination with a gas cutting torch having tip means adapted to provide preheating flames and a cutting oxygen jet of auxiliary means in addition to said tip means and said flames arranged to impart additional heat to the jet of cutting oxygen after it leaves the torch tip and before it reaches the work-piece, and means for cooling said auxiliary means.

HOWARD G. HUGHEY.

REFERENCES CITED

The following references are of record in the file of this patent:

UNITED STATES PATENTS

| Number | Name | Date |
|---|---|---|
| 1,060,409 | Allen | Apr. 29, 1913 |
| 1,247,791 | Carlson | Nov. 27, 1917 |
| 1,606,013 | Wulff | Nov. 9, 1926 |
| 2,267,405 | Jones et al. | Dec. 23, 1941 |
| 2,347,758 | Walker et al. | May 2, 1944 |

FOREIGN PATENTS

| Number | Country | Date |
|---|---|---|
| 641/26 | Australia | Mar. 18, 1926 |
| 88,358 | Austria | May 10, 1922 |
| 298,347 | Germany | June 27, 1917 |
| 455,687 | France | May 30, 1913 |